(12) United States Patent
Zhao et al.

(10) Patent No.: US 6,476,097 B1
(45) Date of Patent: Nov. 5, 2002

(54) AQUEOUS POLYMER PREPARATIONS CONTAINING PIGMENTS

(75) Inventors: Cheng-Le Zhao, Schwetzingen (DE); Uwe Dittrich, Ludwigshafen (DE); Manfred Schwartz, Frankenthal (DE); Wolfgang Hümmer, Birkenheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/743,219
(22) PCT Filed: Jul. 7, 1999
(86) PCT No.: PCT/EP99/04783
§ 371 (c)(1), (2), (4) Date: Jan. 8, 2001
(87) PCT Pub. No.: WO00/02967
PCT Pub. Date: Jan. 20, 2000

(30) Foreign Application Priority Data

Jul. 8, 1998 (DE) .......................... 198 30 554

(51) Int. Cl.$^7$ .............................. C08L 31/02; C08L 83/00
(52) U.S. Cl. ...................... 523/205; 523/201; 524/804; 524/831; 524/833
(58) Field of Search .............................. 524/524, 54.26, 524/831, 833; 525/221, 227, 228; 523/201, 205

(56) References Cited

U.S. PATENT DOCUMENTS

| | | | |
|---|---|---|---|
| 5,185,387 A | 2/1993 | Wolfgang et al. | |
| 5,308,890 A | 5/1994 | Snyder | |
| 5,344,675 A | 9/1994 | Snyder | |
| 5,643,993 A | * 7/1997 | Guerin | ...................... 524/524 |
| 5,744,540 A | 4/1998 | Baumstark et al. | |

FOREIGN PATENT DOCUMENTS

| | | |
|---|---|---|
| CA | 2114246 | 7/1994 |
| EP | 609 756 | 8/1994 |
| EP | 612 805 | 8/1994 |
| EP | 0 623 659 | 11/1994 |
| WO | WO 98/10001 | 3/1998 |

* cited by examiner

Primary Examiner—Tae H. Yoon
(74) Attorney, Agent, or Firm—Oblon, Spivak, McClelland, Maier & Neustadt, P.C.

(57) ABSTRACT

An essentially solventless pigmented aqueous formulation which comprises:
  i) at least one polymer A in the form of polymer particles in disperse distribution, said particles comprising,
    from 80 to 99.9% by weight, based on the overall weight of the polymer A, of a water-insoluble polymer 1 having a glass transition temperature $T_g1$ in the range from −50 to +40° C., built up from ethylenically unsaturated monomers M1, and
    from 0.1 to 20% by weight, based on the overall weight of the polymer A, of one or more water-insoluble polymers i having a glass transition temperature $T_gi$ of more than 50° C., built up from ethylenically unsaturated monomers Mi,
  ii) at least one pigment and, if desired, one or more extenders.

27 Claims, No Drawings

AQUEOUS POLYMER PREPARATIONS CONTAINING PIGMENTS

The present invention relates to aqueous, essentially solventless pigmented formulations comprising at least one aqueous polymer dispersion.

Pigmented aqueous formulations are in widespread use as coating compositions, sealing compounds and, in particular, emulsion paints for architectural protective or decorative purposes. Such formulations generally comprise as their binder a film-forming polymer in the form of an aqueous polymer dispersion, at least one inorganic pigment and, if desired, one or more inorganic fillers along with customary auxiliaries. When the formulations are dried, the polymer particles in the formulation form a polymer film which binds the nonfilm-forming constituents, viz. the pigments and the inorganic extenders.

For reasons of cost the polymeric binders must be able to bind relatively large amounts of a pigment and/or filler. In polymer-bound pigmented formulations the volume ratio of pigment to binder is characterized by the pigment volume concentration PVC (see Ullmanns Enzyklopädie der technischen Chemie, 4th ed. Vol. 15, p. 667). A poor pigment binding capacity results in low mechanical strength at relatively high PVC, and in particular to low wet abrasion resistance and scuff resistance.

The capacity of a polymer to form a film is an essential determinant of the quality of the coatings obtained when the formulations are dried. In principle, the capacity of a polymer to form a film goes up as the glass transition temperature decreases. A low glass transition temperature, however, has the consequence that the polymer film is soft and thus that the coating becomes tacky, which results in poor blocking resistance and carries with it the risk of soiling. In addition, a coating of a "soft" polymer is easily destroyed under mechanical load. If, conversely, the polymer has too high a glass transition temperature, the uniform formation of a film at common processing temperatures is not ensured, and so such coatings generally lack sufficient mechanical strength unless further measures are taken. Conventional formulations based on aqueous polymer dispersions generally comprise a polymer of relatively high glass transition temperature (relatively hard polymer) and small amounts of organic solvents or plasticizers, known as film-forming auxiliaries (coalescants) in order to reduce the minimum film-forming temperature (MFT), i.e., the temperature above which the polymer in the formulation forms a film, and to ensure that a film of the polymer is formed even at low processing temperatures. Solvents and volatile plasticizers are released when the formulation is dried, which is accompanied by an increase in the surface hardness of the polymer film. However, the release of volatile organic constituents, especially in the case of coating compositions for interior applications as, for example, in the case of emulsion paints, is undesirable. Moreover, coatings based on "hard" polymeric binders are often brittle and lack sufficient flexibility.

WO 98/10001 discloses a process for preparing aqueous polymer dispersions by means of a multistage free-radical aqueous emulsion polymerization in a first stage of which a comparatively soft polymer is prepared, then monomers are added to form a hard polymer, this hard polymer is swollen in the soft polymer, and then polymerization is initiated again. The polymer dispersions described are particularly useful as pressure-sensitive adhesives.

EP-A 609 756 describes solventless emulsion paints whose polymeric binder comprises an aqueous dispersion of a staged polymer whose particles comprise a soft polymer phase with a glass transition temperature in the range from −55 to −5° C. and a harder polymer phase with a glass transition temperature in the range from 0 to +50° C. The mechanical stability of the resultant coatings, however, is unsatisfactory.

EP 612 805 discloses binders for solventless emulsion paints which comprise at least one staged polymer which includes preferably more than 25% by weight of a hard polymer phase having a glass transition temperature in the range from +20 to +160° C. and less than 75% by weight of a soft polymer phase having a glass transition temperature of less than +20° C. and a nonfilm-forming polymer having a glass transition temperature in the range from +20 to +160° C. The pigment content of the emulsion paints described in that document is low.

It is an object of the present invention to provide an essentially solventless pigmented formulation based on an aqueous polymer dispersion which overcomes the disadvantages of the prior art and which even with a relatively high pigment content ensures adequate mechanical stability, especially high wet abrasion resistance.

We have found that this object is achieved, surprisingly, by pigmented aqueous formulations which comprise as their polymeric binder an aqueous dispersion of a polymer A whose particles comprise at least 80% by weight of a water-insoluble polymer 1 having a glass transition temperature in the range from −50 to +40° C. and up to 20% by weight of at least one water-insoluble polymer i having a glass transition temperature of more than 50° C.

The present invention accordingly provides an essentially solventless pigmented aqueous formulation comprising:

i) at least one polymer A in the form of polymer particles in disperse distribution, said particles comprising
from 80 to 99.9% by weight, preferably 85 to 99.9% by weight and, in particular, >90 to 99.9% by weight, based on the overall weight of the polymer A, of a water-insoluble polymer 1 having a glass transition temperature $T_g1$ in the range from −50 to +40° C., built up from ethylenically unsaturated monomers M1, and
from 0.1 to 20% by weight, preferably from 0.1 to 15% by weight and, in particular, from 0.1 to <10% by weight, based on the overall weight of the polymer A, of one or more water-insoluble polymers i having a glass transition temperature $T_gi$ of more than 30° C., preferably more than 50° C., especially more than 70° C., built up from ethylenically unsaturated monomers Mi, ii) at least one pigment and, if desired, one or more extenders,
said polymer A being obtainable by free-radical aqueous emulsion polymerization of the monomers Mi in the presence of the polymer 1 and it being true for all polymers i that the difference $T_gi - T_g1$ is >10 K.

An essentially solventless formulation generally comprises less than 0.1%, preferably less than 500 ppm and, in particular, less than 100 ppm of volatile organic constituents. Preferably, the formulations of the invention are also free from low molecular mass plasticizers.

The term glass transition temperature as used in this specification means the temperature determined by DSC (differential scanning calorimetry, 20° C./min, midpoint; cf. ASTM D 3418-82).

The glass transition temperature $T_g1$ of the polymers 1 (and $T_gi$ of the polymers i) can also be estimated from the respective monomer composition of the polymer. According to Fox (T. G. Fox, Bull. Am. Phys. Soc. (Ser. II) 1, 123 [1956] and Ullmanns Enzyklopädie der technischen Chemie, 4th edition, Volume 19, Verlag Chemie, Weinheim (1980), p. 17, 18) the glass transition temperature of copolymers at high molecular masses is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ the glass transition temperatures, in degrees Kelvin, of the homopolymers of the monomers $1, 2, \ldots, n$. Sources of tabulated glass transition temperatures of homopolymers are, for example, Ullmann's Encyclopedia of Industrial Chemistry, $5^{th}$ ed., VCH, Weinheim, Vol. A 21 (1992) p. 169 and J. Brandrup, E. H. Immergut, Polymer Handbook $2^{nd}$ ed, J. Wiley, N.Y. 1975, pp. 139–192.

The minimum film-forming temperature, i.e., the temperature below which the particles of the polymer A do not form a stable film and therefore do not form a stable coating with the pigment and the extenders, correlates approximately to the glass transition temperature $T_g1$ of the polymer 1, but the minimum film-forming temperature generally lies below the glass transition temperature $T_g1$ of the polymer 1. In order to ensure straightforward processing even at low ambient temperatures the polymer A in the formulations of the invention has a minimum film-forming temperature of generally below 10° C. and preferably below 5° C. Accordingly, the glass transition temperature of the polymer 1 is chosen to be preferably $\leq 20°$ C. and in particular $\leq 10°$ C. Where higher processing temperatures are possible, such as in regions having a high ambient temperature, the polymer A in the formulation of the invention can of course have a higher minimum film-forming temperature, e.g., 30° C., corresponding to a $T_g1$ in the range from 20 to 40° C. Preferably, the $T_g1$ will not go below a value of −40° C., especially −25° C., so as to ensure sufficient hardness and strength of the polymer film.

It is advantageous, furthermore, if the result $\Delta T_g = T_g i - T_g 1$ is >20 K, especially >30 K, with particular preference >40 K and, specifically, >50 K. $\Delta T_g$ can be up to 150 K and with very particular preference is in the range from 60 to 120 K.

The particulate polymer A present in the formulation of the invention comprises, in accordance with the invention, not only the polymer 1 but also one or more polymers i, preferably just one polymer i. In particularly preferred embodiments the polymers A contain >90 to 99% by weight, in particular from 92 to 98% by weight, of a polymer 1 and from 1 to <10% by weight, in particular from 2 to 8% by weight, of a polymer i. Both the polymer 1 and the polymers i are built up predominantly from monoethylenically unsaturated, hydrophobic monomers MH and are therefore insoluble in water. In general, the constituent monomers M1 of the polymer 1 and the constituent monomers Mi of the polymer i include at least 80% by weight, preferably at least 90% by weight and, in particular, at least 95% by weight of hydrophobic monomers MH, i.e., monomers having a water solubility of below 50 g/l at 25° C.

Typical monomers MH are vinylaromatic monomers, such as styrene, α-methylstyrene, α-phenylstyrene, o-chlorostyrene or vinyltoluenes, vinyl esters of aliphatic $C_1$–$C_{18}$-monocarboxylic acids, such as vinyl acetate, vinyl propionate, vinyl butyrate, vinyl valerate, vinyl pivalate, vinyl hexanoate, vinyl-2-ethyl hexanoate, vinyl decanoate, vinyl laurate, vinyl stearate and commercial monomers VEOVA® 5-11 (VEOVA® X is a tradename of Shell and stands for vinyl esters of α-branched, aliphatic carboxylic acids having X carbon atoms, which are also referred to as Versatic® X acids) and also the esters of ethylenically unsaturated $C_3$–$C_8$ mono- or dicarboxylic acids, such as acrylic, methacrylic, crotonic, maleic, itaconic, citraconic and fumaric acid with $C_1$–$C_{18}$-, preferably $C_1$–$C_{12}$- and, in particular $C_1$–$C_8$-alkanols or $C_5$–$C_{10}$-cycloalkanols. Examples of suitable $C_1$–$C_{18}$-alkanols are methanol, ethanol, n-propanol, i-propanol, 1-butanol, 2-butanol, isobutanol, tert-butanol, n-hexanol, 2-ethylhexanol, lauryl alcohol and stearyl alcohol. Examples of suitable cycloalkanols are cyclopentanol, cyclohexanol, 4-tert-butylcyclohexan-1-ol, 3,3,5-trimethylcyclohexan-1-ol and isoborneol. They are especially the esters of acrylic and/or methacrylic acid, such as methyl methacrylate, ethyl acrylate, ethyl methacrylate, n-butyl acrylate, n-butyl methacrylate, isobutyl acrylate, isobutyl methacrylate, tert-butyl acrylate, tert-butyl methacrylate, hexyl acrylate, hexyl methacrylate, n-octyl acrylate, n-octyl methacrylate, 2-ethylhexyl acrylate, 2-ethylhexyl methacrylate, decyl acrylate, lauryl acrylate, stearyl acrylate, isobornyl acrylate, isobornyl methacrylate, norbornyl acrylate, norbornyl methacrylate, 4-tert-butylcyclohexyl acrylate, 4-tert-butylcyclohexyl methacrylate, 3,3,5-trimethylcyclohexyl acrylate, 3,3,5-trimethylcyclohexyl methacrylate, and also the esters of fumaric and of maleic acid, examples being dimethyl fumarate, dimethyl maleate and di-n-butyl maleate. It is also possible to employ α-olefins such as ethylene, propene and isobutene and also vinyl chloride or vinylidene chloride as comonomers. To a minor extent the hydrophobic monomers MH also include ethylenically unsaturated nitrites such as acrylonitrile and methacrylnitrile.

The hydrophobic monomers MH are preferably selected from the abovementioned vinylaromatic monomers and the abovementioned esters of acrylic and methacrylic acid with $C_1$–$C_{12}$-alkanols or $C_5$–$C_{10}$-cycloalkanols. A portion of the abovementioned hydrophobic monomers, but preferably not more than 50% by weight and in particular not more than 30% by weight, can be replaced by an ethylenically unsaturated nitrile, such as acrylonitrile or methacrylonitrile.

The monomers M1 and Mi may also include monomers of heightened water solubility, i.e., >100 g/l (at 25° C.) (monomers MW). Monomers MW are usually employed in amounts from 0.1 to 10% by weight, preferably from 0.2 to 5% by weight, based on the overall weight of the monomers M1 and Mi. Preferably, the monomers Mi do not include monomers MW. The monomers MW include monoethylenically unsaturated $C_3$–$C_8$ monocarboxylic acids, such as acrylic, methacrylic, crotonic, vinylacetic, acrylamidoglycolic and methacrylamidoglycolic acid, monoethylenically unsaturated $C_4$–$C_8$ dicarboxylic acids, such as maleic, itaconic and citraconic acid, their monoesters with $C_1$–$C_{12}$-alkanols, such as monomethyl maleinate and mono-n-butyl maleinate, ethylenically unsaturated sulfonic acids, such as vinylsulfonic, 2-acrylamido-2-methylpropanesulfonic, 2-acryloyloxyethanesulfonic, 2-methacryloyloxyethanesulfonic, 3-acryloyloxypropanesulfonic, 3-methacryloyloxypropanesulfonic and vinylbenzenesulfonic acid and the salts thereof, preferably their alkali metal salts or ammonium salts and, in particular, their sodium salts. The monomers MW also include neutral monomers, examples being the amides of ethylenically unsaturated monocarboxylic acids, such as acrylamide and methacrylamide, the hydroxyalkyl esters of the abovementioned ethylenically unsaturated mono- and dicarboxylic acids, examples being hydroxyethyl acrylate, hydroxypropyl acrylate and 4-hydroxybutyl acrylate, the corresponding methacrylates and water-soluble N-vinyllactams, such as N-vinylpyrrolidone. Preferred monomers MW are acrylic, methacrylic and itaconic acids, acrylamide and methacrylamide.

The monomers M1 and Mi may also include monomers having two or more nonconjugated ethylenically unsaturated double bonds, such as the diesters of alcohols having a hydricity of two or more with $\alpha,\beta$-monoethylenically unsaturated $C_3$–$C_8$ carboxylic acids, examples being glycol bisacrylate, diethylene glycol bisacrylate, 1,6-hexanediol bisacrylate, or esters of $\alpha,\beta$-monoethylenically unsaturated carboxylic acids with alkenols, examples being vinyl acrylate, allyl acrylate, bicyclodecenyl acrylate and corresponding methacrylates, and also divinylbenzene, N,N'-divinylurea, N,N'-divinylimidazolinone and diallyl phthalate. Such monomers are, where desired, used in minor amounts, i.e., in amounts from 0.01 to 2% by weight based on the overall monomer amount. Preferably, the monomers M1 include no such monomers.

In many cases it is favorable for the monomers M1 and/or the monomers Mi to comprise minor amounts, such as from 0.1 to 10% by weight, of monomers which cause crosslinking only in the course of film formation. Examples which may be mentioned are carbonyl monomers such as acrolein, methacrolein, diacetoneacrylamide and -methacrylamide, and vinyl acetoacetate. The abovementioned monomers bring about post-crosslinking, for example when the aqueous polymer dispersion at the same time contains an appropriate amount of an added polyamine compound. Particularly suitable such compounds are the dihydrazides of $C_2$–$C_{10}$aliphatic dicarboxylic acids. Examples thereof are oxalic dihydrazide, malonic dihydrazide, succinic dihydrazide, glutaric dihydrazide, adipic dihydrazide and sebacic dihydrazide. Another post-crosslinking monomer is, for example, 2-acetoacetoxyethyl methacrylate (alone or in combination with polyamines or polyaldehydes such as glyoxal). Further suitable post-crosslinking monomers are those having hydrolyzable Si-organic bonds. Examples which may be mentioned are the copolymerizable monomers methacryloyloxypropyltrimethoxysilane and vinyltrimethoxysilane. Further suitable monomers of appropriate type can be found in DE-A 43 41 260. If the disperse polymer particles have carboxyl groups, post-crosslinking can also be brought about by adding metal salts that have polyvalent cations (e.g., Mg, Ca, Zn or Zr salts). Also suitable for the purpose of post-crosslinking are epoxy- and/or N-alkylol-functional monomers such as glycidyl acrylate, N-methylolacrylamide and N-methylolmethacrylamide, for example. Post-crosslinking can also be realized by copolymerizing small amounts of unsaturated benzophenone derivatives or acetophenone derivatives with photoinitiation later on. Alternatively, corresponding, saturated benzophenone derivatives or acetophenone derivatives can be incorporated by stirring into the formulations of the invention.

The monomers M1 and/or Mi may also include minor amounts, such as from 0.1 to 5% by weight, of adhesion monomers (examples being nitrogeneous monomers) in order to increase the adhesion of the film of the resulting aqueous polymer dispersion to numerous materials such as wood, metal, minerals, paper, textiles and plastics and, in particular, to old coatings based on drying oils and/or alkyd resins and to reduce the sensitivity of the adhesion to the effects of humidity and wetness (enhanced wet adhesion). Particularly suitable nitrogenous monomers are free-radically polymerizable monomers having at least one amino group, urea, or N-heterocyclic groups. A large number of such suitable adhesion monomers can be found in EP-B 421 185, in EP-B 379 892 on page 3, in EP-A 609 756 on page 2, in DE-A 43 34 178 and in DE-A 39 02 067 on pages 3/4.

By way of example mention may be made of aminoethyl acrylate and methacrylate, dimethylaminoethyl acrylate and methacrylate, diethylaminoethyl acrylate and methacrylate, dimethylaminopropyl acrylate and methacrylate, 3-dimethylamino-2,2-dimethylpropyl 1-acrylate and methacrylate, 2-N-morpholinoethyl acrylate and methacrylate, 2-N-piperidinoethyl acrylate and methacrylate, N-(3-dimethylaminopropyl)acrylamide and -methacrylamide, N-dimethylaminoethylacrylamide and methacrylamide, N-diethylaminoethylacrylamide and methacrylamide, N-(4-morpholinomethyl)acrylamide and methacrylamide, vinylimidazole and also monoethylenically unsaturated derivatives of ethyleneurea (=imidazolidin-2-one) such as N-(2-acryloyloxyethyl) imidazolidin-2-one, N-($\beta$-acrylamidoethyl)imidazolidin-2-one, N-2-(allylcarbamato)aminoethylimidazolidin-2-one, N-[(3-allyloxy-2-hydroxypropyl)aminoethyl]imidazolidin-2-one, N-vinylimidazolidin-2-one, N-(methacryloxyacetoxyethyl) imidazolidin-2-one, N-(acrylamidoethylene)imidazolidin-2-one, N-(methacrylamidoethylene)imidazolidin-2-one, 1-(2-methacryloyloxyethyl)imidazolidin-2-one and N-(methacrylamidoethyl)imidazolidin-2-one. Monomers with amino or urea groups can be post-crosslinked with low molecular mass dialdehydes or polyaldehydes, such as with aliphatic dialdehydes such as glyoxal, for example.

In a preferred embodiment of the invention the monomers MH comprise:

from 20 to 80% by weight, in particular from 50 to 70% by weight, based on the monomers MH, at least one monomer MHa whose homopolymer has a glass transition temperature of less than 10° C. and from 20 to 80% by weight, in particular from 30 to 50% by weight, based on the monomers MH, of at least one monomer MHb whose homopolymer has a glass transition temperature of more than 30° C.

Preferred monomers MHa are the esters of acrylic acid with $C_1$–$C_{12}$-alkanols, especially n-butyl acrylate and 2-ethylhexyl acrylate, vinyl esters of aliphatic carboxylic acids, and ethylene, and mixtures thereof; preferred monomers MHb are the esters of methacrylic acid with $C_1$–$C_4$-alkanols, styrene, $\alpha$-methylstyrene and acrylonitrile.

Preferably, the constituent monomers Mi of the polymer i include only hydrophobic monomers MH, the proportion of ethylenically unsaturated nitriles generally being below 50% by weight and, preferably, below 30% by weight, based on the monomers Mi. Hydrophobic monomers MH preferably included among the monomers Mi are methyl methacrylate, tert-butyl acrylate, n-butyl methacrylate, isobutyl methacrylate, tert-butyl methacrylate, isobornyl acrylate, isobornyl methacrylate, 4-tert-butylcyclohexyl acrylate, 4-tert-butylcyclohexyl methacrylate, 3,3,5-trimethylcyclohexyl acrylate, 3,3,5-trimethylcyclohexyl methacrylate, styrene, $\alpha$-phenylstyrene, $\alpha$-methylstyrene, acrylonitrile and mixtures thereof.

One specific embodiment of the present invention relates to pigmented formulations in which the polymer particles of the polymer A are built up from i. from 80 to 90% by weight of a polymer 1 built up from
from 30 to 49.9% by weight of methyl methacrylate, styrene or mixtures thereof,
from 50 to 69.9% by weight of n-butyl acrylate, 2-ethylhexyl acrylate or mixtures thereof, and from 0.2 to 3% by weight of at least one monomer MW, and ii. from 0.1 to 20% by weight of a polymer i built up from at least one ester of acrylic acid with a $C_1$–$C_4$-alkanol, tert-butyl acrylate, styrene or mixtures of these.

It has also been found advantageous for the particles of the polymer A to have a weight-average diameter in the range from 50 to 1000 nm (determined by means of an ultracentrifuge or by photon correlation spectroscopy; on particle size determination by means of ultracentrifuge see, e.g., W. Mächtle, Makromolekulare Chemie, 1984, Vol. 185, 1025–1039, W. Mächtle, Angew. Makromolekulare Chemie, 1988, 162, 35–42). In the case of binder dispersions with high solids contents, e.g. >50% by weight based on the overall weight of the binder dispersion, it is advantageous on viscosity grounds for the weight-average particle diameter of the polymer particles in the dispersion to be $\geq$150 nm. The average particle diameter will not exceed in general 1000 nm and preferably 600 nm. It is also advantageous for the individual diameters of the polymer particles not to be uniform but instead to be distributed over a relatively wide diameter range.

The polymers A of the invention are generally prepared by a multistage free-radical emulsion polymerization process in an aqueous polymerization medium. Generally, in a first polymerization stage, the polymer 1 is prepared by free-radical aqueous emulsion polymerization of the monomers M1. Then, in a second polymerization stage in the resultant aqueous dispersion of the polymer 1, a first polymer i is prepared by polymerizing a first batch of the monomers Mi. The second polymerization stage is therefore a free-radical aqueous emulsion polymerization of the monomers Mi in the presence of the polymer 1 prepared in the first polymerization stage. Said second polymerization stage can be followed by further polymerization stages in which further batches of the monomers Mi, which may differ in composition from the first batch of monomers Mi, are polymerized in the presence of the polymer of the preceding polymerization stage. Such processes are known from the prior art as embodied, for example, by U.S. Pat. No. 3,562,235, EP-A 600 478, EP-A 609 756 and EP-A 612 805.

The formulations of the invention preferably comprise a polymer A which is obtainable by a multistage free-radical emulsion polymerization in the form of a swelling polymerization (known as a swelling polymer). Such swelling polymers, or rather the polymer films obtainable from them, are notable for particularly favorable mechanical properties and for a particularly low soiling tendency. To prepare the swelling polymers an aqueous dispersion of the polymer 1 is prepared conventionally in a first stage by free-radical aqueous emulsion polymerization. Then, in further polymerization stages, the polymers i are prepared by free-radical aqueous emulsion polymerization of the monomers Mi in the presence of the polymer 1, the monomers Mi polymerized in the respective stage i being added to the polymerization vessel in such a way that a significant proportion of them is able to dissolve, or to swell, the polymer 1 (or the polymer of the respective preceding polymerization stage) already present in the polymerization vessel. The monomers Mi, therefore, are polymerized while dissolved in the disperse polymer particles (i.e., after swelling of the disperse polymer P1). The process of swelling polymerization is described in detail in WO 98/10001.

The swelling of the polymers 1 by the monomers i is brought about as follows: the polymerization of the monomers M1 is essentially at an end before the addition of the monomers i is begun in the second polymerization stage, and in the second and any subsequent polymerization stages the monomers Mi are added such that during their addition the polymerization conversion $U^i$ of the monomers Mi to be polymerized in the respective polymerization stage at no point exceeds 50 mol %, preferably 40 mol %, especially 30 mol %, with particular preference 20 mol %, or 10 mol % or 5 mol %. It is particularly advantageous to substantially interrupt the polymerization prior to the addition of the monomers Mi to be polymerized in a stage i and only to recommence the polymerization after all of the monomers Mi to be polymerized in the stage i have been added. In this case, the total amount of monomers Mi to be polymerized in the stage i can be added either all at once or a little at a time to the polymerization vessel. Interrupting the polymerization can be effected by means of measures such as temperature reduction, addition of polymerization inhibitors (free-radical scavengers such as hydroquinone, for example), initiator consumption, etc.

Swelling of the polymer particles already present in disperse distribution in the aqueous medium in the polymerization vessel by the monomers Mi to be polymerized at a polymerization stage i is facilitated by adding the monomers Mi in pure form rather than emulsifying them beforehand in an aqueous medium. It is also advantageous if the addition is made, in the case of substantially interrupted polymerization, at elevated temperatures, for example, at from 30 to 80° C., and/or if the polymerization of the monomers Mi is not started until a period of time has elapsed following the addition of the monomers Mi, for example, after a period of a few minutes to several hours. For further details reference may be made here to WO 98/10001, the full disclosure content of which is hereby incorporated by reference.

The preparation of the polymer 1 (independently of the mode of preparation of the polymer i) takes place usually by the method of free-radical aqueous emulsion polymerization, i.e., in the presence of dispersant and at least one free-radical polymerization initiator.

Suitable dispersants include both emulsifiers and the protective colloids which are commonly employed to carry out free-radical aqueous emulsion polymerizations. Dispersants are normally used in amounts of from 0.1 to 10% by weight, preferably from 0.5 to 5% by weight, based on the overall amount of the monomers M1 to be polymerized.

Examples of suitable protective colloids are polyvinyl alcohols, starch derivatives and cellulose derivatives, and vinylpyrrolidone copolymers. A detailed description of further suitable protective colloids is given in Houben-Weyl, Methoden der organischen Chemie, Volume XIV/1, Makromolekulare Stoffe [Macromolecular substances], Georg-Thieme-Verlag, Stuttgart 1961, p. 411–420.

It is preferred as dispersants to employ exclusively emulsifiers, whose relative molecular weights, unlike those of the protective colloids, are usually below 2000. They can be either anionic or nonionic in nature. The anionic emulsifiers include alkali metal salts and ammonium salts of alkyl sulfates (alkyl: $C_8$–$C_{12}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). The properties of the formulations of the invention are effected in a particularly advan tageous manner by the use as dispersants of compounds of the formula I

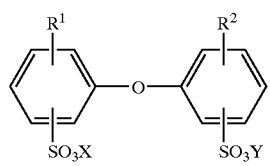

(I)

in which $R^1$ and $R^2$ are hydrogen or $C_4$–$C_{24}$-alkyl, preferably $C_8$–$C_{16}$-alkyl, but are not both hydrogen and X and Y can be alkali metal ions and/or ammonium ions. It is common to use technical-grade mixtures of compounds of the formula I which contain from 50 to 90% by weight of the monoalkylated product, an example being Dowfax® 2A1 ($R^1=C_{12}$-alkyl; DOW CHEMICAL). The compounds I are common knowledge, from U.S. Pat. No. 4,269,749, for example, and are obtainable commercially.

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers.

Preference is given to ethoxylates of long-chain alkanols (alkyl: $C_{10}$–$C_{22}$, average degree of ethoxylation: 3 to 50) and, of these, particular preference to those based on oxo alcohols and naturally occurring alcohols having a linear or branched $C_{12}$–$C_{18}$-alkyl radical and a degree of ethoxylation of 8 to 50.

To prepare the polymers 1 it is preferred to employ combinations of at least one anionic emulsifier, such as a compound of the formula I, and at least one nonionic emulsifier, such as the ethoxylate of a long-chain alkanol (alkyl: $C_{10}$–$C_{22}$, average degree of ethoxylation: 3 to 50).

Other suitable emulsifiers are given in Houben-Weyl, op. cit., pp. 192–208.

Free-radical polymerization initiators suitable for preparing the polymer 1 include in principle peroxides, such as hydrogen peroxide, organic peroxides such as dibenzoyl peroxide, dilauryl peroxide and diacetyl peroxide, and hydroperoxides such as pinane hydroperoxide, p-menthane hydroperoxide, diisopropylphenyl hydroperoxide, cumene hydroperoxide and tert-butyl hydroperoxide, peracids such as peroxopivalate, alkali metal and ammonium peroxodisulfates such as sodium peroxodisulfate or ammonium peroxodisulfate, and azo compounds. It is preferred to use redox initiator systems, which are composed of at least one organic reducing agent and at least one peroxide, hydroperoxide or peracid. Particularly suitable reducing agents are sulfur compounds such as the sodium salt of hydroxymethanesulfinic acid, sodium sulfite, sodium disulfite, sodium thiosulfate or acetone-bisulfite adduct, nitrogen compounds such as triethylamine, hydrazine and hydroxylamine, and also ascorbic, glycolic and tartaric acids. Preference is also given to those redox initiator systems which include a small amount of a metal compound which is soluble in the polymerization medium and whose metallic component is able to exist in a plurality of valence states, examples being vanadium sulfate, iron(II) sulfate and iron complexes, such as the complex of iron with ethylenediaminetetraacetic acid (as the sodium salt: Na—Fe—EDTA). The amount of free-radical initiators employed, based on the overall amount of monomers to be polymerized, is preferably from 0.1 to 2% by weight.

When polymerizing the monomers M1 it is possible to employ regulators in amounts, for example, of from 0 to 1 part by weight based on 100 parts by weight of the monomers M1 to be polymerized. These regulators reduce the molecular mass; suitable examples are compounds having a thiol group such as tert-butyl mercaptan, 2-ethylhexyl thioglycolate, mercaptoethanol, mercaptopropyltrimethoxysilane, and tert-dodecyl mercaptan. It is preferred not to use any regulator.

When preparing the polymer 1 the pressure and temperature of polymerization are of very minor importance. It is usual to operate at temperatures from 0 to 100° C., frequently from 20 to 100° C. and in the majority of cases from 50 to 95° C. It is possible to employ reduced or elevated pressure, so that the temperature of polymerization may even exceed 100° C. and can be up to 130° C. or more. Preferably, highly volatile monomers such as ethylene or butadiene are polymerized under elevated pressure. To regulate the pH of the polymerization medium it is possible during the free-radical aqueous emulsion polymerization to prepare the polymer 1 to add buffers such as $NaHCO_3$, $Na_2CO_3$, Na acetate or $Na_4P_2O_7$.

To improve reproducibility and establish defined particle diameters, when preparing the polymer 1 it is possible for the skilled worker to decouple the polymer particle formation phase from the polymer particle growth phase in a conventional manner by using a defined amount of an aqueous polymer dispersion (a seed latex) which is formed beforehand and introduced into the polymerization vessel or is formed beforehand in situ within said vessel.

An especially simple way of performing the free-radical aqueous emulsion polymerization to prepare an aqueous dispersion of a polymer 1 is as follows: the monomers to be polymerized are emulsified in the aqueous medium and the free-radical polymerization initiator is dissolved in water. Water is charged to the polymerization vessel and heated to the polymerization temperature. Then a portion of the aqueous monomer emulsion and a portion of the aqueous initiator solution are added all at once to the initial charge and polymerized. Subsequently, while maintaining the polymerization, the remainder of the aqueous monomer emulsion and the remainder of the aqueous initiator solution are supplied continuously and, preferably, essentially with synchronicity to the polymerization vessel. After the initiator and monomer feeds are at an end, the polymerization mixture will judiciously be left to itself for a certain time, with stirring, during which the polymerization temperature is maintained.

Subsequently, to perform the following polymerization stages i, the monomers to be polymerized in stage i will be added to the polymerization vessel in the manner described above, e.g., continuously, a little at a time or in a single portion, as they are or in the form of an aqueous emulsion. In the case of swelling polymerization, the monomers i are preferably added as they are and all at once and, with particular preference, the temperature in the polymerization reactor is reduced before adding the monomers Mi so that the polymerization reaction comes to a standstill. The emulsifier content of the aqueous dispersion of the polymer 1 will advantageously be made such that the aqueous dispersion medium contains essentially no emulsifier micelles. After that, the advantageously cooled reactor contents are generally judiciously left to themselves for a while, with stirring, in order to promote swelling. Thereafter, fresh free-radical polymerization initiator is normally added and then the batch is heated to the polymerization temperature and polymerized as desired. Further polymerization stages i can be added on correspondingly if required.

Free-radical polymerization initiators which can be used to initiate the polymerization stages i are in principle all those already specified in the context of the preparation of the dispersion of the polymer 1. It is preferred, however, to employ those free-radical initiator systems which comprise organic peroxides or organic hydroperoxides, especially redox initiator systems based on organic peroxides and/or hydroperoxides. In particular, free-radical initiator systems comprising tert-butyl hydroperoxide and cumene hydroperoxide are suitable. Particularly suitable reductants are alkali metal sulfites, ascorbic acid, acetone bisulfite, and the alkali metal salts of hydroxymethanesulfinic acid. Based on the monomers to be polymerized in a polymerization stage i, the amount of free-radical polymerization initiator added will generally be from 0.1 to 2% by weight. In view of the preferred use of organic redox initiator systems in the polymerization stages i, the associated polymerization temperature will normally be below 80° C. (usually $\leq$50° C. to $\leq$80° C.). As far as the pressure of polymerization is concerned, the comments made in relation to the preparation of the polymer 1 apply.

Following the polymerization reaction proper it may be necessary to free the aqueous polymer dispersions of the invention substantially from odoriferous substances, such as residual monomers and other volatile organic constituents. In a conventional manner this can be achieved physically, by distillative removal (especially by way of steam distillation) or by stripping with an inert gas. Additionally, the amount of residual monomers can be lowered chemically by free-radical post-polymerization, especially with the action of redox initiator systems, as set out, for example, in DE-A 44 35 423. Preferably, post-polymerization is conducted with a redox initiator system comprising at least one organic peroxide and one organic sulfite.

Before being used in the formulations of the invention, the dispersions of the polymer A are preferably adjusted to a pH in the range from 6 to 10, preferably by adding a nonvolatile base such as, for example, alkali metal or alkaline earth metal hydroxides or nonvolatile amines.

By means of emulsion polymerization it is possible in principle to obtain dispersions having solids contents of up to about 80% by weight (polymer content based on the overall weight of the dispersion). On practical grounds, polymer dispersions having solids contents in the range from 40 to 70% by weight are generally preferred for the formulations of the invention. Particular preference is given to dispersions having polymer contents from about 50 to 60% by weight. Dispersions with lower solids contents are of course also suitable in principle for use for the formulations of the invention.

One preferred embodiment of the present invention relates to formulations in the form of emulsion paints.

The formulations of the invention, especially the emulsion paints, contain generally from 30 to 75% by weight and preferably from 40 to 65% by weight of nonvolatile constituents. These are all constituents of the formulation other than water, but at least the entirety of binder, extender, pigment, nonvolatile solvents (boiling point above 220° C.), such as plasticizers, and polymeric auxiliaries. They comprise roughly i from 3 to 90% by weight, preferably from 10 to 60% by weight, of solid binder constituents (=polymer A)

ii from 5 to 85% by weight, preferably from 10 to 60% by weight, of at least one pigment, iii from 0 to 85% by weight, preferably from 20 to 70% by weight, of one or more extenders, and iv from 0.1 to 40% by weight, preferably from 0.5 to 15% by weight, of customary auxiliaries.

In general, the weight ratio of polymer A to the total mass of pigment and extender in the formulation of the invention is in the range from 3:1 (corresponding to a PVC of about 10) to 1:15 (corresponding to a PVC of about 85), preferably from 2:1 to 1:15 and, in particular, from 1:1 to 1:15.

In one preferred embodiment of the invention the PVC is in the range of >40% to 60% by weight, e.g. about 45% by weight. In another preferred embodiment of the invention the PVC is >60%, preferably >70%, and can be up to 85%.

Examples of typical pigments for the formulations of the invention, especially for emulsion paints, are titanium dioxide, preferably in the rutile form, barium sulfate, zinc oxide, zinc sulfide, basic lead carbonate, antimony trioxide, lithopone (zinc sulfide+barium sulfate). However, the formulations may also include color pigments, examples being iron oxides, carbon black, graphite, luminescent pigments, zinc yellow, zinc green, ultramarine, manganese black, antimony black, manganese violet, Paris Blue or Schweinfurt green. In addition to the inorganic pigments the formulations of the invention may also comprise organic color pigments, examples being sepia, gamboge, Cassel Brown, toluidine red, para red, Hansa yellow, indigo, azo dyes, anthraquinonoid and indigoid dyes, and also dioxazine, quinacridone, phthalocyanine, isoindolinone and metal complex pigments.

Suitable extenders basically comprise alumosilicates, such as feldspars, silicates, such as kaolin, talc, mica, magnesite, alkaline earth metal carbonates, such as calcium carbonate in the form, for example, of calcite or chalk, magnesium carbonate, dolomite, alkaline earth metal sulfates, such as calcium sulfate, silicon dioxide, etc. The extenders can be employed as individual components. In industry, however, mixtures of extenders have become established, examples being calcium carbonate/kaolin, and calcium carbonate/talc. Dispersion plasters may also include coarser aggregates, such as sands or sandstone granules. In emulsion paints, of course, finely divided extenders are preferred. The emulsion paints of the invention also include particulate nonfilmforming polymers, such as polystyrene dispersions, in order to modify the surface gloss and the color of the coat of paint.

It is common in the preferred emulsion paints to employ finely divided extenders, such as finely divided calcium carbonate or mixtures of different calcium carbonates having different particle sizes to increase the hiding power and to save on the use of white pigments. To adjust the hiding power, shade and depth of color it is preferred to employ blends of color pigments and extenders.

The customary auxiliaries iv. include wetting agents and dispersants, such as sodium, potassium or ammonium polyphosphates, alkali metal salts and ammomium salts of polyacrylic acids and polymaleic acid, polyphosphonates, such as sodium 1-hydroxyethane-1,1-diphosphonate, and salts of naphthalenesulfonic acid, especially its sodium salts. The dispersants are generally employed in an amount of from 0.1 to 0.6% by weight based on the overall weight of the emulsion paint.

The auxiliaries iv may also include thickeners, examples being cellulose derivatives, such as methylcellulose, hydroxyethylcellulose and carboxymethylcellulose, and also casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid-acrylamide and methacrylic acid-acrylate copolymers, and what are known as associative thickeners, examples being styrene-maleic anhydride polymers or, preferably, hydrophobically modified polyetherurethanes, as are described, for example, by N. Chen et al. in J. Coatings Techn. Vol 69, No. 867, 1997, p. 73 and by R. D. Hester et al. J. Coatings Technology, Vol. 69, No. 864, 1997, 109 and whose disclosure content is hereby incorporated fully by reference.

Examples of hydrophobically modified polyetherurethanes are polymers of the formula II

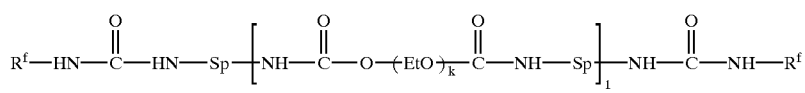

(II)

in which $R^f$ is a hydrophobic radical, preferably a linear or branched alkyl radical of 10 to 20 carbon atoms, Et is 1,2-ethylene, Sp is $C_2$–$C_{10}$-alkylene, cycloalkylene or arylene, k is a number in the range from 50 to 1000 and l is a number in the range from 1 to 10, the product k×l preferably being within the range from 300 to 1000.

It is also possible to use inorganic thickeners such as bentonite or hectorite. Thickeners are generally used in amounts of from 0.1 to 3% by weight, preferably from 0.1 to 1% by weight, based on the overall weight of the aqueous formulation. Furthermore, the auxiliaries iv generally also include defoamers, preservatives, hydrophobicizing agents, biocides, or further constituents.

In order to adjust the film-forming properties of the binder polymers the coating compositions may also include what are known as film-forming consolidating agents (plasticizers), examples being ethylene glycol, propylene glycol, butylene glycol, hexylene glycol, alkyl ethers and alkyl ether esters of glycols and polyglycols, such as diethylene glycol monoethyl ether, diethylene glycol monoethyl ether acetate, diethylene glycol monobutyl ether, hexylene glycol diacetate, propylene glycol monoethyl, monophenyl, monobutyl and monopropyl ethers, dipropylene glycol monomethyl ether, dipropylene glycol mono-n-butyl ether, tripropylene glycol mono-n-butyl ether, and the acetates of said monoalkyl ethers, e.g., butoxybutyl acetate, and also alkyl esters of aliphatic mono- and dicarboxylic acids, such as Texanol® from Eastman, or technical-grade mixtures of dibutyl esters of succinic, glutaric and adipic acids. Film-forming auxiliaries are usually employed in an amount such that the formulation has a minimum film-forming temperature of <15° C. and preferably in the range from 0 to 10° C. Preferably, the formulations of the invention do not contain a film-forming auxiliary.

The formulations of the invention are stable fluid systems which can be used to coat a large number of substrates. Examples of suitable substrates are wood, concrete, metal, glass, ceramics, plastic, plasters, wall coverings, and coated, primed or weathered substrates. Application of the formulation to the target substrate takes place in a manner dependent on the form of the formulation. Depending on the viscosity and pigment content of the formulation and on the substrate, application may take place by rolling, brushing, knife coating or spraying.

The coatings produced using the formulations of the invention are suitable not only for high surface hardness having improved elasticity (elongation at break and tear strength) but also for high wet abrasion resistance. Improved wet abrasion resistance, i.e., improved mechanical stability of the coatings to abrasive influences in the moist state, is favorable for the weathering stability and wet cleaning resistance of the coatings and therefore means that they are washable. In addition, the coatings are not tacky and possess high blocking resistance. The coatings produced using the formulations of the invention are notable, furthermore, for a low soiling tendency even on prolonged weathering.

The advantageous properties of the polymer A as binder relative to binder polymers of the prior art, and especially its improved wet abrasion resistance, is manifested in pigmented formulations having a PVC <40% and in formulations having a PVC >40% or a PVC >60%. The advantages of the invention are particularly evident if the formulations have a PVC >40% and up to 85% by 10 weight, for example a PVC of about 45% or a PVC of from 70 to 80%. Accordingly, the present invention also provides for the use of the polymer A for improving the wet abrasion resistance of pigmented formulations.

The examples set out below are intended to illustrate the invention without, however, restricting it.

I. Preparing and characterizing the polymer dispersions (copolymers P)

Particle diameter
　The particle size (Z-average) of the polymer particles was determined by dynamic light scattering on a 0.01% by weight dispersion at 23° C. using an Autosizer IIc from Malvern Instruments, UK. The value reported is the cumulant z-average diameter of the measured autocorrelation function.

Glass transition temperature
　The glass transition temperature was determined by DSC in accordance with the midpoint method ASTM-D 3418-82).

Minimum film-forming temperature
　The minimum film-forming temperature (MFT) of the polymer dispersions was measured in a manner similar to that described in Ullmanns Enzyklopädie der technischen Chemie, 4th edition, Vol. 19, VCH Weinheim 1980, p. 17. The instrument used for the measurement was a film formation bench (metal plate to which a temperature gradient is applied and on which temperature sensors are mounted at various points for temperature calibration, the temperature gradient being chosen so that one end of the film formation bench has a temperature above the expected MFT and the other end has a temperature below the expected MFT. The aqueous polymer dispersion is applied to the film formation bench. In those regions of the film formation bench whose temperature is above the MFT a clear film is formed on drying, whereas in the cooler areas cracks appear in the film and at even lower temperatures a white powder is formed. The MFT is determined visually on the basis of the known temperature profile of the plate.

Elongation at break and tear strength
　To determine the mechanical properties of the film of the aqueous polymer dispersions they were diluted to a solids content of 25% by weight. Subsequently, a sample of the dilute aqueous polymer dispersion was dried in a 15 cm×15 cm×0.6 cm silicone mold at 23° C. and 50% relative atmospheric humidity for 2 weeks. The amount of sample was calculated so that the resulting film thickness was about 0.1 cm. The tear strength (in MPa) and elongation at break were determined in a manner similar to that of DIN 53 455 and DIN 53 504. The stated measurements are means of 5 measurements on 5 test specimens. For those measurements the film was detached from the silicone mold, and the test specimens required for the tensile test were punched out from the film. The format used for the sample specimens was the dumbbell format described as standard rod S2 in DIN 53 504 (see section 2.4.11.6). The thickness of the samples was examined with the calipers of DIN 53 370 with circular contact pieces of 10 mm in diameter. The sample specimens were clamped into the jaws of a tensile tester and torn apart at a pulling speed of 250 mm/min. The elongation at break is the elongation at the moment of tearing. It relates to 23° C. and 1 atm and is reported as $[(L-L_o)/L_o] \times 100(\%)$, where $L_o$=is the original measured length, and
L=is the measured length on tearing.

Correspondingly, the tear strength is the force applied at the moment of tearing. It is usually reported based on the cross section. The values for the dispersions CD1, D1, D2 und D3 are reported in Table 1.

1. Comparative dispersion CD1

A polymerization vessel was charged under nitrogen with 250 ml of deionized water and 1.26 g of a 1.4% strength by weight aqueous solution of the Fe-EDTA complex (as the sodium salt) and this initial charge was heated to 70° C. The temperature was kept the same and then, in one portion, 2% of the monomer emulsion and 20% each of initiator solutions I and II were added to the polymerization vessel and the temperature was held for 30 minutes. Thereafter, beginning simultaneously, the remainder of the monomer emulsion and the remaining amounts of initiator solutions I and II were added to the polymerization vessel over the course of 3 h and 4 h respectively, beginning simultaneously, by way of separate feeds. After the end of the addition of initiator, 1.14 g of 70% strength by weight aqueous tert-butyl hydroperoxide solution and 6.11 g of a 13% strength by weight aqueous solution of acetone bisulfite adduct were added in one portion and a temperature of 70° C. was maintained for one hour. The mixture was subsequently cooled to room temperature, neutralized to a pH of 7.8 with 10% strength by weight sodium hydroxide solution, and filtered. The dispersion obtained had a solids content of 57.6% by weight. The weight-average polymer particle diameter was 310 nm; the MFT was below 0° C. The glass transition temperature of the polymer as determined by means of DSC was 5.2° C.

Monomer emulsion:
  138.5 g of water
  14.2 g of Dowfax® 2A1 (45% strength by weight solution in water)
  40.0 g of an ethoxylated $C_{16}$–$C_{18}$-fatty alcohol having an average degree of ethoxylation of 18 (20% strength by weight solution in water)
  480.0 g of n-butyl acrylate
  320.0 g of methyl methacrylate
  16.0 g of a 50% strength by weight aqueous acrylamide solution,
Initiator solution I:
  3.43 g of 70% strength by weight aqueous tert-butyl hydroperoxide solution
  70.0 g of deionized water
Initiator solution II:
  18.3 g of 13% strength by weight aqueous solution of acetone bisulfite adduct
  70.0 g of deionized water 2. Inventive dispersion D1

A polymerization vessel was charged under nitrogen with 250 ml of deionized water and 1.26 g of a 1.4% strength by weight aqueous solution of the Fe—EDTA complex (as the sodium salt) and this initial charge was heated to 70° C. The temperature was kept the same and then, in one portion, 2% of the monomer emulsion and 20% each of initiator solutions I and II were added to the polymerization vessel and the temperature was held for 30 minutes. Thereafter, beginning simultaneously, the remainder of the monomer emulsion and the remaining amounts of initiator solutions I and II were added to the polymerization vessel over the course of 3 h and 4 h respectively, beginning simultaneously, by way of separate feeds. After the end of the addition of initiator the mixture was cooled to 40° C. and then 16 g of tert-butyl methacrylate were added in one portion to the polymerization vessel. After a further 10 minutes at 40° C. 2.3 g of a 70% strength by weight aqueous tert-butyl hydroperoxide solution and 12.2 g of a 13% strength by weight aqueous solution of the acetone bisulfite adduct were added in one portion after which the mixture was heated to 60° C. and the 60° C. were maintained for one hour. The mixture was subsequently cooled to room temperature, neutralized to a pH of 8.0 with 10% strength by weight sodium hydroxide solution, and filtered. The dispersion obtained had a solids content of 57.9% by weight. The weight-average polymer particle diameter was 195 nm; the MFT was below 0° C. The glass transition temperature of the polymer as determined by means of DSC was 5.1° C.

Monomer emulsion:
  134.0 g of water
  14.2 g of Dowfax® 2A1 (45% strength by weight solution in water)
  40.0 g of an ethoxylated $C_{16}$–$C_{18}$-fatty alcohol having an average degree of ethoxylation of 18 (20% strength by weight solution in water)
  470.4 g of n-butyl acrylate
  313.6 g of methyl methacrylate
  16.0 g of 50% strength by weight aqueous acrylamide solution,
Initiator solution I:
  3.43 g of 70% strength by weight aqueous tert-butyl hydroperoxide solution
  70.0 g of deionized water
Initiator solution II:
  18.3 g of 13% strength by weight aqueous solution of acetone bisulfite adduct
  70.0 g of deionized water 3. Inventive dispersion D2

A dispersion D2 was prepared by the procedure specified for dispersion D1. The monomer emulsion had the composition indicated below. 48 g of tert-butyl methacrylate were used. After cooling, the dispersion was neutralized to a pH of 7.5 and then filtered. The dispersion obtained had a solids content of 56.2% by weight. The weight-average polymer particle diameter was 300 nm; the MFT was below 0° C. The glass transition temperature of the polymer was 5.1° C.

Monomer emulsion:
- 134.0 g of water
- 14.2 g of Dowfax® 2A1 (45% strength by weight solution in water)
- 40.0 g of an ethoxylated $C_{16}$–$C_{18}$-fatty alcohol having an average degree of ethoxylation of 18 (20% strength by weight solution in water)
- 451.2 g of n-butyl acrylate
- 300.8 g of methyl methacrylate
- 16.0 g of 50% strength by weight aqueous acrylamide solution.

4. Inventive dispersion D3

A dispersion D3 was prepared by the procedure specified for dispersion D1. The monomer emulsion had the composition indicated below. 80 g of tert-butyl methacrylate were used. After cooling, the dispersion was neutralized to a pH of 7.5 and then filtered. The dispersion obtained had a solids content of 54.9% by weight. The weight-average polymer particle diameter was 300 nm; the MFT was below 0° C. The glass transition temperature of the polymer was 8.0° C.

Monomer emulsion:
- 134.0 g of water
- 14.2 g of Dowfax® 2A1 (45% strength by weight solution in water)
- 40.0 g of an ethoxylated $C_{16}$–$C_{18}$-fatty alcohol having an average degree of ethoxylation of 18 (20% strength by weight solution in water)
- 432.0 g of n-butyl acrylate
- 288.0 g of methyl methacrylate
- 16.0 g 50% strength by weight aqueous acrylamide solution.

5. Inventive dispersion D4

A dispersion D4 was prepared by the procedure specified for dispersion D1. The monomer emulsion had the composition indicated below. 40 g of tert-butyl methacrylate were used. After cooling, the dispersion was neutralized to a pH of 7.5 and then filtered. The MFT was below 2° C.

Monomer emulsion:
- 134.0 g of water
- 14.2 g of Dowfax® 2A1 (45% strength by weight solution in water)
- 40.0 g of an ethoxylated $C_{16}$–$C_{18}$-fatty alcohol having an average degree of ethoxylation of 18 (20% strength by weight solution in water)
- 456.0 g of n-butyl acrylate
- 304.0 g of methyl methacrylate
- 16.0 g of 50% strength by weight aqueous acrylamide solution.

6. Inventive dispersion D5

A dispersion D5 was prepared by the procedure specified for dispersion D4. 40 g of methyl methacrylate were used instead of tert-butyl methacrylate. After cooling, the dispersion was neutralized to a pH of 7.5 and then filtered. The MFT was below 2° C.

TABLE 1

| Dispersion | t-BMA [% by wt.][1] | TS[2] [MPa] | EB[3] [%] |
|---|---|---|---|
| CD1 | 0 | 3.2 | 625 |
| D1 | 2 | 3.9 | 590 |
| D2 | 6 | 6.3 | 510 |
| D3 | 10 | 9.2 | 430 |

[1]% by weight of tert-butyl methacrylate based on overall monomer amount
[2]Tear strength
[3]Elongation at break II. Preparing the formulations of the invention The pigmented formulations were prepared by blending the stated components with dispersions CD1 and D1 to D5 diluted to a polymer content of 50% by weight.

The components indicated below were mixed in the order stated in a high-speed mixer:

| | |
|---|---|
| Water | 100.0 parts |
| Dispersant[1] | 2.0 parts |
| Sodium polyphosphate solution[2] (in water) | 4.0 parts |
| Commercial biocide[3] | 3.0 parts |
| Defoamer[4] | 2.0 parts |
| Thickener A[5] | 50.0 parts |
| Sodium hydroxide solution (20% strength by weight) | 2.0 parts |
| Titanium pigment | 155.0 parts |
| Calcium carbonate | 175.0 parts |
| Talc | 55.0 parts |

The following were then added with stirring:

| | |
|---|---|
| Defoamer[4] | 1.0 part |
| Dispersion (50% strength by weight) | 370.0 parts |
| Thickener B[9] | 50.0 parts |
| Water | 1.5 parts. |

[1]30% strength by weight aqueous ammonium polyacrylate solution from BASF AG
[2]Calgon ®, BK-Ladenburg GmbH, Germany
[3]1,2-Benzisothiazolin-3-one
[4]Agitan ® A280 from Münzing-Chemie GmbH, Heilbronn
[5]Natrosol ® 250 HR, 2% strength by weight aqueous solution of hydroxyethylcellulose; Hercules GmbH, Düsseldorf
[6]Titanium dioxide: Kronos ® 2043 from Kronos Titan GmbH, Leverkusen
[7]Omyacarb 5GU, average particle size 5 μm; Omya GmbH, Cologne
[8]Talc AT1; Norwegische Talk Deutschland GmbH, 63628 Bad Soden-Salmünster
[9]Polyurethane thickener Rheolat ®208, 5% strength by weight aqueous solution; RHEOX GmbH, Leverkusen.

Determining the pendulum hardness:

The pendulum hardness was determined in accordance with DIN 53157. To this end a sample was prepared by coating a glass plate with each of the formulations of the invention in a coat thickness of at least 30 μm. Prior to the test the coating was allowed to dry for 5 weeks. The pendulum hardness was determined using a König apparatus in accordance with DIN 53157. The value reported is the time in seconds within which the amplitude of the pendulum has fallen from 6° to 3°. An increase in the value corresponds to increasing surface hardness of the coating. The results are summarized in Table 2.

Determining the wet abrasion resistance:

The formulations of the invention were tested for their abrasion resistance in a manner similar to that of DIN 53778 Sheet 2: a coating film was applied to a Leneta sheet measuring about 430×80 mm using a 60 mm wide coater. The gap height was chosen so as to give a dry film thickness of 100 μm. The film was dried under standard climatic conditions for 28 days. Then an abrasion brush was passed over the coating in an abrasion device, accompanied by continual dropwise application of a 0.25% strength aqueous solution of sodium n-dodecylbenzenesulfonate. The number of back-and-forth strokes until the coating is abraded right through was used as a measure of the scuff resistance or wet abrasion resistance. The results are summarized in Table 2.

TABLE 2

| Example | Dispersion | Pendulum hardness [sec] | Wet abrasion resistance |
|---------|------------|--------------------------|--------------------------|
| C1      | CD1        | 16.8                     | 1350                     |
| 1       | D1         | 18.3                     | 1750                     |
| 2       | D2         | 23.8                     | 2200                     |
| 3       | D3         | 30.8                     | 1950                     |

Determining the soiling tendency:

To determine the soiling tendency, coating samples were set up in an outdoor weathering stand at Ludwigshafen on the Rhine, in the Rhineland Palatinate, with an inclination of 45° and were weathered for one year. The dirt pickup was determined visually on the basis of a scale of ratings from 0 to 5, in which a rating of 0 corresponds to no observable soiling and a value of 5 to marked soiling. The values are reported in Table 3 for the formulations of d ispersions CD1, D4 and D5.

TABLE 3

| Example | Dispersion | Soiling tendency |
|---------|------------|------------------|
| C1      | CD1        | 3                |
| 4       | D4         | 2                |
| 5       | D5         | 2                |

We claim:

1. A pigmented aqueous formulation which is essentially free from organic solvents, comprising:

i) at least one polymer A in the form of polymer particles in disperse distribution, said particles comprising from 90 to 99% by weight, based on the overall weight of the polymer A, of a water-insoluble polymer 1 having a glass transition temperature $T_g1$ in the range of −50 to +40° C., built up from ethylenically unsaturated monomers M1, and from 1 to 10% by weight, based on the overall weight of the polymer A, of one or more water-insoluble polymers i having a glass transition temperature $T_gi$ of more than 30° C., built up from ethylenically unsaturated monomers Mi, wherein, for all polymers i, the difference $T_gi-T_g1$ is >10° K, ii) at least one pigment and, optionally, one or more extenders, wherein the polymer A is obtained by a multistage free-radical emulsion polymerization process in an aqueous polymerization medium, comprising the successive stages of:

a) preparing a polymer 1 by polymerizing the monomers 1 in a first polymerization stage, b) preparing a first polymer i by polymerizing a first batch of the monomers Mi in the presence of the polymer 1 in a second polymerization stage, c) optionally, preparing further polymers i by polymerizing further monomers Mi in successive polymerization stages i in the presence of the polymer of the respective preceding polymerization stage, the polymerization of the monomers M1 being essentially at an end before the addition of the monomers Mi is begun in the second polymerization stage, and the addition of the monomers Mi in the second and any subsequent polymerization stages taking place such that, during the addition of the monomers Mi, the polymerization conversion $U^i$ of the monomers Mi to be polymerized in the respective preceding polymerization stage at no point exceeds 50 mol %.

2. A formulation as claimed in claim 1, wherein the monomers M1 and the monomers Mi each comprise at least 80% by weight of monoethylenically unsaturated, hydrophobic monomers MH.

3. A formulation as claimed in claim 2, wherein the monomers MH are selected from vinylaromatic monomers, the esters of acrylic acid with $C_1$–$C_{12}$-alkanols or $C_5$–$C_{10}$-cycloalkanols, and the esters of methacrylic acid with $C_1$–$C_{12}$-alkanols or $C_5$–$C_{10}$-cycloalkanols.

4. A formulation as claimed in claim 2, wherein the monomers M1 comprise as monomers MH, from 20 to 80% by weight, based on the monomers MH, of at least one monomer MHa whose homopolymer has a glass transition temperature of less than 10° C. and from 20 to 80% by weight, based on the monomers MH, of at least one monomer MHb whose homopolymer has a glass transition temperature of more than 30° C.

5. A formulation as claimed in claim 2, wherein the monomers M1 additionally comprise at least one monoethylenically unsaturated monomer MW which is copolymerizable with the monomers MH and has a water solubility of >100 g/l (at 25° C.).

6. A formulation as claimed in claim 2, wherein the monomers Mi comprise exclusively hydrophobic monomers MH.

7. A formulation as claimed in claim 6, wherein the monomers MH are selected from methyl methacrylate, tert-butyl acrylate, n-butyl methacrylate, isobutyl methacrylate, tert-butyl methacrylate, isobornyl acrylate, isobornyl methacrylate, 4-tert-butylcyclohexyl acrylate, 4-tert-butylcyclohexyl methacrylate, 3,3,5-trimethylcyclohexyl acrylate, 3,3,5-trimethylcyclohexyl methacrylate, styrene, α-phenylstyrene, α-methylstyrene and acrylonitrile.

8. A formulation as claimed in claim 1, wherein the polymerization reaction is essentially interrupted after the end of the addition of the monomers M1, the monomers Mi of the second polymerization stage are added in one portion, the resultant mixture is optionally stirred, the polymerization is continued, and this procedure is repeated for any required further polymerization stages after the end of the respective preceding polymerization stage.

9. A formulation as claimed in claim 1 which is in the form of an emulsion paint.

10. A formulation as claimed in claim 1, wherein the weight ratio of polymer A to the total mass of pigment and extender in the formulation is in the range from 3:1 to 1:15.

11. A formulation as claimed in claim 1, wherein $T_gi$ is more than 50° C.

12. A formulation as claimed in claim 11, wherein $T_gi$ is more than 70° C.

13. A formulation as claimed in claim 1, wherein $T_g1$ is in the range from −50 to 20° C.

14. A formulation as claimed in claim 11, wherein $T_g1$ is in the range from −50 to 10° C.

15. A formulation as claimed in claim 1, wherein $T_g1$ is in the range from 20 to 40° C.

16. A formulation as claimed in claim 1, wherein $T_g1$ is in the range from −40° C. to 40° C.

17. A formulation as claimed in claim 1, wherein $T_g1$ is in the range from −25° C. to 40° C.

18. A formulation as claimed in claim 1, wherein $T_gi-T_g1$ is >20° K.

19. A formulation as claimed in claim 18, wherein $T_gi-T_g1$ is >30° K.

20. A formulation as claimed in claim 19, wherein $T_gi-T_g1$ is >40° K.

21. A formulation as claimed in claim 20, wherein $T_gi-T_g1$ is >50° K.

22. A formulation as claimed in claim 1, wherein $T_gi-T_g1$ is up to 150° K.

23. A formulation as claimed in claim 1, wherein $T_gi-T_g1$ is 60 to 120° K.

24. A formulation as claimed in claim 1, wherein the water-insoluble polymer 1 is present in an amount of from 92 to 98% by weight, and the one or more water-insoluble polymers i is present in an amount of from 2 to 8% by weight.

25. A formulation as claimed in claim 1, wherein the particles comprise from 80 to 90% by weight of said polymer 1 comprising
from 30 to 49.9% by weight of methyl methacrylate, styrene or mixtures thereof,
from 50 to 69.9% by weight of n-butyl acrylate, 2-ethylhexyl acrylate or mixtures thereof, and
from 0.2 to 3% by weight of at least one water-soluble monomer, and from 0.1 to 20% by weight of said polymer i comprising at least one ester of acrylic acid with a $C_1-C_4$-alkanol, tert-butyl acrylate, styrene or mixtures thereof.

26. A formulation as claimed in claim 25, wherein polymer 1 comprises a mixture of n-butyl methacrylate, methylmethacrylate, and acrylamide, and polymer i comprises tert-butyl acrylate.

27. A formulation as claimed in claim 25, wherein polymer 1 comprises a mixture of n-butyl methacrylate, methylmethacrylate, and acrylamide, and polymer i comprises methyl methacrylate.

* * * * *